United States Patent [19]

Franklin

[11] Patent Number: 4,763,474

[45] Date of Patent: Aug. 16, 1988

[54] CONTROL SYSTEM FOR A VARIABLE INLET AREA TURBOCHARGER TURBINE

[75] Inventor: Philip C. Franklin, Huddersfield, England

[73] Assignee: Holset Engineering Company Limited, Turnbridge, England

[21] Appl. No.: 875,950

[22] Filed: Jun. 19, 1986

[30] Foreign Application Priority Data

Jun. 19, 1985 [GB] United Kingdom ............... 8515502

[51] Int. Cl.⁴ ............................................. F02B 37/12
[52] U.S. Cl. ................................................. 60/602
[58] Field of Search ................. 60/600, 601, 602, 603

[56] References Cited

U.S. PATENT DOCUMENTS

| | | | |
|---|---|---|---|
| 2,373,139 | 4/1945 | Morris | 60/602 |
| 2,480,621 | 8/1949 | Warner | 60/602 |
| 4,211,081 | 7/1980 | Yamada | 60/602 |
| 4,270,356 | 6/1981 | Will et al. | 60/602 |
| 4,336,688 | 6/1982 | Dellis | 60/602 |
| 4,499,732 | 2/1985 | Szczupak et al. | 60/602 |

Primary Examiner—Michael Koczo
Attorney, Agent, or Firm—Gary M. Gron; Robert T. Ruff; Alan R. Loudermilk

[57] ABSTRACT

A pneumatic control system for the variable area turbine inlet of a turbocharger of an internal combustion engine. The variable turbine inlet is actuated by a pneumatic actuator having a first connection to compressor boost pressure and a second connection to turbine inlet pressure. The actuator increases turbine inlet area in response to an increase in pressure and a one way valve in the compressor boost connection causes the actuator pressure to be the higher of compressor boost or turbine inlet pressure. As a result, turbine pumping losses during high engine rpm low power conditions are minimized.

5 Claims, 2 Drawing Sheets

CONTROL SYSTEM FOR A VARIABLE INLET AREA TURBOCHARGER TURBINE

This invention relates to a variable inlet area turbocharger and more specifically to a control system for this turbocharger.

Various proposals have been made for varying the effective inlet area of the turbine of a turbocharger for an internal combustion engine. Typically these proposals provide that at low engine rpm or low turbocharger compressor output pressure (boost pressure) the effective turbine inlet area is controlled to a minimum to increase the velocity of the exhaust gas entering the turbine wheel, and that high engine speed or high boost pressure the effective turbine inlet area is increased to reduce the velocity of the exhaust gas entering the turbine wheel and prevent excessive boost pressure.

Published European Patent Specification Nos. 0080810, 0095853 and 0131406 describe mechanisms which vary the effective inlet area of a turbocharger turbine by displacement of a movable member which forms one side wall of the turbine nozzle inlet. Displacement of the movable member may be in response to an engine operating parameter such as engine rpm or compressor boost pressure or a combination of such parameters. One or more actuators connected to the movable member move the member between maximum area and minimum area positions. A pre-loading spring may be conveniently arranged to bias the movable member towards the minimum area condition, the member being moved towards the maximum area condition by fluid pressure acting against a diaphragm within the actuator to overcome the bias of the spring. The fluid pressure may be provided by air from the turbocharger compressor outlet or air from an external source such as an engine driven compressor.

For such systems to function satisfactorily it is necessary to control the displacement of the movable member as a function of one or more engine operating parameters to achieve an effective turbine inlet area which optimizes engine performance throughout the engine operating speed and load range.

A partial form of control is achieved by what are referred to as boost control systems in which the effective turbine inlet are is varied in proportion to the turbocharger compressor outlet pressure. In the simplest form this may be achieved by admitting the compressor outlet pressure directly to a spring pre-loaded diaphragm actuator. By suitable sizing of the diaphragm and spring the system is substantially self-regulating giving good engine transient response. However, such a system is not responsive to either engine rpm or engine load and does not give the turbine inlet area that produces the most efficient operation of the engine under all operation conditions.

A more complex control system is described in European Patent Application No. 84-306273.8 in which means are provided for varying the effective turbine inlet area as a function of engine rpm. At high rpms the effective inlet area is maintained substantially in its maximum area condition, at low rpms the effective inlet area is maintained substantially in its minimum area condition, and at intermediate rpms the effective inlet area increases with increases in engine rpm. A signal representing the actual effective inlet area is fed back to the inlet are controlling actuator and the position of the actuator is corrected by the feedback signal to achieve a predetermined effective inlet area.

It is known from published European Patent Specification No. 0108905 to provide a bypass conduit between the turbine inlet and compressor outlet of a turbocharger, the bypass incorporating a non-return valve which permits gas flow only from the compressor to the turbine inlet. The inlet area of the turbine is however not controlled by the pressure in the bypass conduit which is provided to improve low speed running rather than to control turbine inlet area.

U.S. Pat. No. 4,499,731 describes a turbocharger in which a conduit is provided between the turbine inlet and the compressor outlet, the conduit incorporation a non-return valve. This arrangement is provided to avoid surging of the compressor at low gas flow rates. The turbine inlet area is not a function of the pressure in the conduit.

In the above systems it is difficult to achieve the goal of good transient response and turbine area giving optimum efficiency without complicated and expensive control systems.

The above problems are solved in accordance with the present invention by a control system for a variable inlet turbocharger. The control system comprises an actuator for the variable inlet, the actuator being responsive to a control signal to increase the effective inlet area as a direct function of the control signal. A means is provided to selectively apply to the actuator the higher of a signal proportional to compressor outlet pressure and a signal proportional to turbine inlet pressure so that turbine inlet throttling losses are minimized during certain engine operating conditions.

According to a more specific aspect of the present invention, the actuator responds to direct pressure signals from the compressor outlet and turbine inlet and a connection from the compressor via a pressure limiting connection provides a variable bias that enables turbine inlet throttling losses to be further minimized.

An embodiment of the present invention will now be described by way of example with reference to the accompanying drawings, in which.

Figure 1:
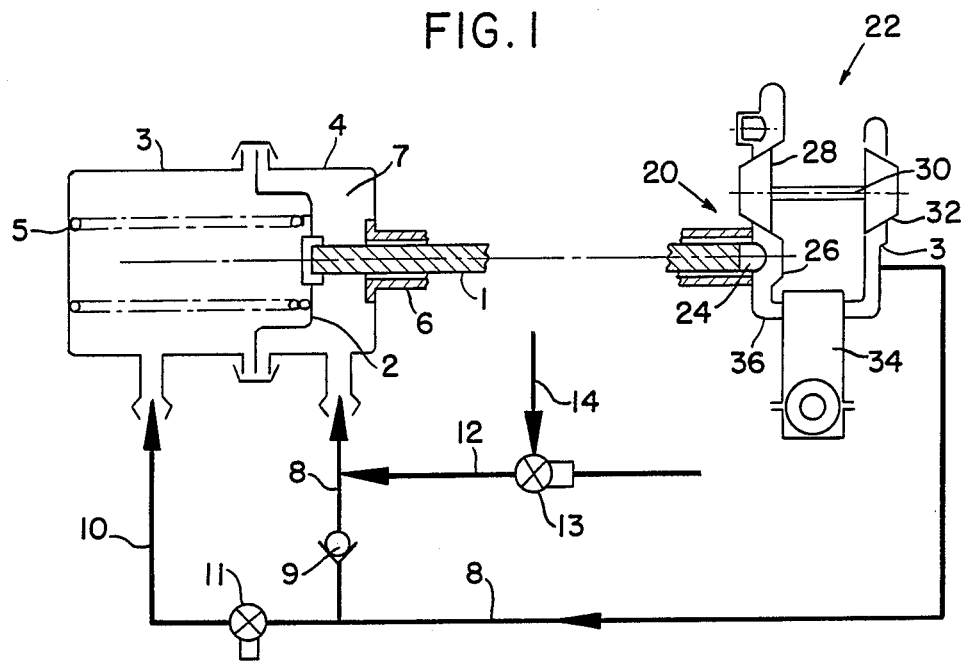
FIG. 1 is a schematic illustration of a preferred embodiment of the present invention.

Referring to FIG. 1, an actuator shaft 1 is connected to a flexible diaphragm 2 secured between component parts 3 and 4 of a diaphragm housing. The end of the actuator shaft 1 remote from the diaphragm 2 is secured to a mechanism 20 for controlling the turbine inlet area of a turbocharger 22 to which the device is fitted. The mechanism attached to the shaft 1 may be of the type illustrated for example in published European Specification No. 0080810 although it will be appreciated that any suitable turbine inlet area adjusting mechanism could be actuated by the shaft 1 such as an annular ring 24 displaceable into a turbine inlet housing 26 that surrounds a turbine wheel 28 of the turbocharger. The turbine wheel is journalled in the turbocharger by a shaft 30, which also connects to and journals a compressor wheel 32. Exhaust gases from an internal combustion engine 34 pass through a manifold 36 and across the turbine 28 thereby rotating it so that the compressor wheel pressurizes air for delivery through a compressor outlet 38 to the internal combustion engine.

A pre-loading spring 5 is positioned between the diaphragm 2 and the housing component 3 so as to urge the diaphragm and the shaft 1 to the right in FIG. 1.

The shaft 1 extends through a sleeve 6 which defines a restricted passageway around the shaft 1 which communicates at one end with a chamber 7 defined between the diaphragm 2 and the housing component 4 and at the other end with the turbine inlet housing 26. Thus the passageway defined by the sleeve 6 around the circumference of shaft 1 constitutes a first conduit through which gas may flow to and from the chamber 7.

The chamber 7 is connected by a second conduit 8 to the turbocharger compressor outlet 38. A non-return valve 9 is provided in the conduit 8 such that the non-return valve 9 closes when the pressure in the conduit 8 on the side of the valve 9 adjacent the chamber 7 exceeds the pressure in the conduit 8 on the other side of the valve 9. When the valve 9 is open the pressure within chamber 7 is substantially the same as the compressor outlet pressure. When the valve 9 is closed the pressure in chamber 7 corresponds to the turbine inlet pressure. The position of the shaft 1 and hence the inlet area of the turbine is a function of the differential pressure across the diaphragm 2 and the spring constant and pre-load of the pre-loading spring 5.

A third conduit 10 may be connected between the conduit 8 which carries the compressor output pressure and the side of the diaphragm 2 remote from the chamber 7. A pressure regulator 11 is connected in conduit 10 so that the pressure in conduit 10 corresponds to the compressor output pressure until that output pressure exceeds a predetermined threshold and thereafter the pressure within conduit 10 is held at a predetermined level by the regulator 11. The pressure in conduit 10 thus effectively provides pre-loading to the diaphragm 2 which corresponds precisely with the function of the pre-loading spring 5 so long as the pressure 10 is at the predetermined level determined by the regulator 11 but the characteristic response of the device is changed when the pressure in conduit 10 corresponds to the pressure in conduit 8. The spring 5 must be reduced in strength to compensate for the fact that some pre-loading is now provided by the pressure delivered via conduit 10.

A further feature of the illustrated arrangement is a conduit 12 which connects the conduit 8 on the side of the non-return valve 9 adjacent the chamber 7 to a solenoid controlled valve 13 which when operated connects the conduit 12 to a conduit 14 that in turn is connected to an external supply of pressurized air, for example an engine driven compressor. A control device can be provided (not shown) which monitors engine rpm and opens the valve 13 when a predetermined rpm is exceeded. This then supplies high pressure air via conduits 14, 12 and 8 to the chamber 7 causing the turbine inlet area to be increased to its maximum extent. Thus it is possible to override the relationship between turbine inlet area, boost pressure and turbine inlet pressure when a predetermined engine speed is exceeded.

As shown in FIG. 1 the turbine inlet pressure may be conveniently admitted to the chamber 7 through the clearance between the actuator shaft 1 and the bearing member 6 which is supported in the diaphragm housing component 4. It should be noted that although this communicates the chamber 7 and thus the diaphragm 2 with hot gases at the turbine inlet the presence of the non-return valve 9 prevents this hot gas from flowing continuously through the chamber 7 even if the turbine inlet pressure is greater than the compressor outlet pressure. Thus, the arrangement ensures that only a very small amount of hot gas is delivered to the chamber 7 and therefore the diaphragm 2 is protected against damage due to overheating. On the other hand when the compressor outlet pressure is greater than the turbine inlet pressure a flow of cooling air is driven through the chamber 7 and thence out through the member 6 to the turbine inlet. Thus the diaphragm is protected against damage due to overheating.

Figure 2:
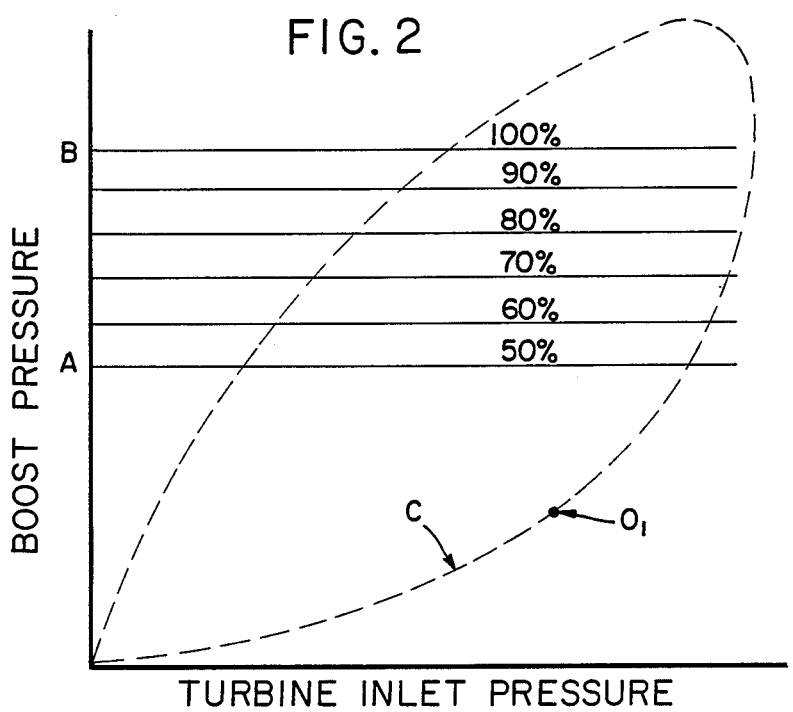
FIG. 2 illustrates the variation in inlet area with respect to compressor outlet pressure (boost pressure) and turbine inlet pressure in an arrangement in accordance with the prior art.

Before discussing the operation of the control system in FIG. 1 it is helpful to illustrate the manner in which a control system operates that utilizes solely the boost pressure as the control input. FIG. 2 shows the variation in boost pressure with turbine inlet pressure for an engine operating regime. The somewhat oval dashed line curve represented by "C" is the boundary of the engine operating conditions. The upper portion of the curve represents a full power condition and the lower portion of the curve represents a minimum power condition. The horizontal family of curves represents the percentage of full turbine inlet opening in the variable inlet mechanism 24. Curve B represents a fully opened turbine inlet and any increase in boost pressure beyond that level will not produce a further increase in turbine inlet area. On the other hand any reduction in boost pressure below curve A keeps the turbine inlet area at the minimum value regardless of the reduction in boost pressure. Such a system gives good response for engine acceleration but has the problem of over boosting the engine during high rpm low power settings. To illustrate this principle, we show point $0_1$ on the bottom side of curve C. Point $0_1$ represents a condition of high engine rpm and low power output. In this case the boost pressure is below the pressure along line A which would cause the turbine inlet area to increase. As a result, the boost pressure is maintained at a level that is higher than necessary. The resultant throttling or pumping losses across the turbine by virtue of the minimum inlet area significantly effects efficiency and therefore the fuel economy of engine 34.

Figure 3:
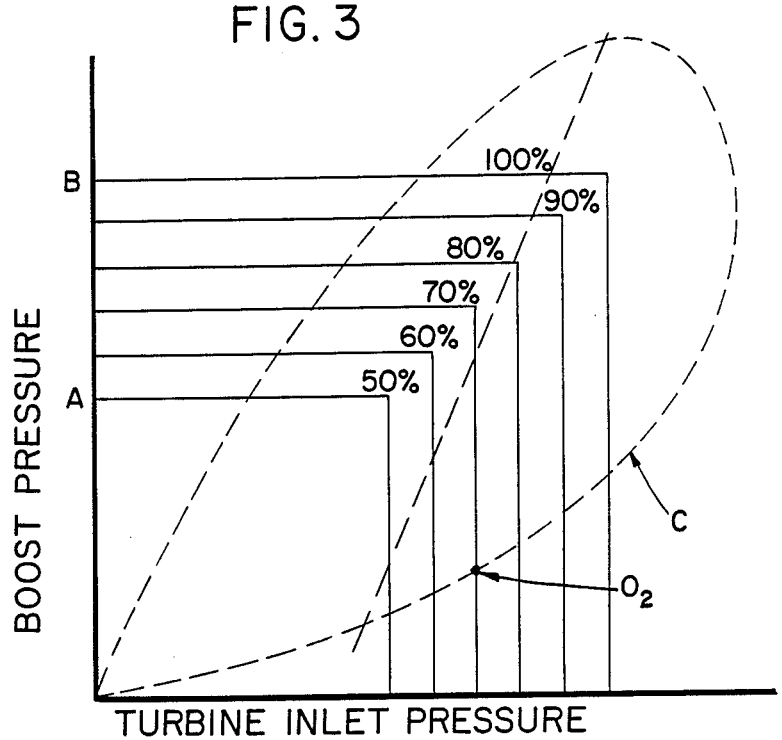
FIG. 3 illustrates the variation in inlet area with respect to boost pressure and turbine inlet pressure in accordance with an embodiment of the invention which is a modification of that shown in FIG. 1.

The above problems are solved by the control system of FIG. 1 which has an operating characteristic set forth in FIG. 3. The same values of boost pressure and turbine inlet pressure are on the axes and the curve C, while generally the same configuration as the same curve in FIG. 2, is slightly altered because of the additional utilization of turbine inlet pressure to control the opening. As pointed out previously the pressure in chamber 7 which sets the amount of opening for the turbine inlet nozzle is a direct function of the higher of the turbine inlet or compressor discharge pressures. Consequently the control system under some circumstances will open the turbine inlet nozzle to a greater extent than it would with the control of compressor discharge pressure alone. This situation occurs during high rpm low power conditions. The chevron configured family of curves shown in FIG. 3 illustrates the characteristic relationship between boost pressure, turbine inlet pressure and nozzle opening for the control system of FIG. 1 excluding line 10, regulator 11, lines 12 and 14, and solenoid control valve 13. Thus at an engine operating condition of high rpm and low power represented by point $0_2$, the turbine inlet pressure is higher than the boost pressure. As a result the non return valve blocks flow out of line 8 in the FIG. 1 control system and causes only the turbine inlet pressure to be applied to chamber 7. Therefore the variable area inlet mechanism is opened from a minimum area position to a point somewhat above 70% open. When this occurs the turbocharger rpm is reduced and the boost falls so that the inlet area decreases slightly to establish the new control point at point $0_2$. In a direct comparison with FIG. 2 it can be seen that the point $0_2$ produces a boost pressure and turbine inlet pressure significantly lower. Thus reduction in both the turbine inlet pressure and boost pressure translates directly into a reduction of throttling losses across the turbine thereby giving an increase in efficiency.

Figure 4:
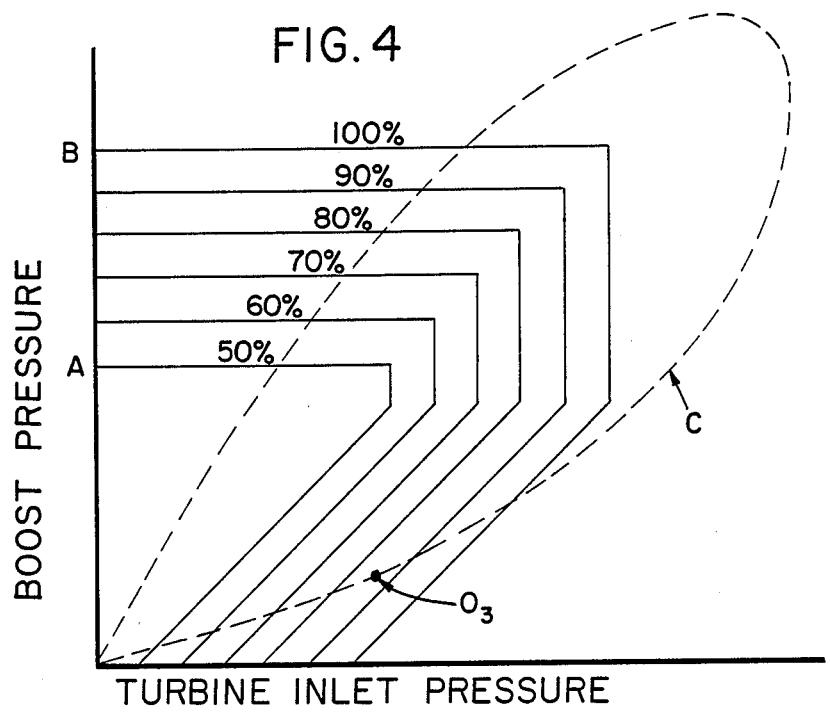
FIG. 4 illustrates the variation in inlet area with respect to boost pressure and turbine inlet pressure in the embodiment of the invention illustrated in FIG. 1.

The addition of the line 10 and the regulator 11 to the actuator 3 provides a way of further minimizing throttling losses as shown in FIG. 4. FIG. 4 shows the same boost pressure and turbine inlet pressure values, and engine operating curve C that is further modified. A family of curves are chevron shaped in the upper portion like those in FIG. 3 but have a bend in the lower portion caused by the provision of the additional control input. The reason for this bend in the curve is that a variable bias is provided to balance the force in chamber 7 to establish the turbine inlet area. During operating conditions when the boost pressure is above the minimum set by the regulator 11 there is essentially a constant bias against diaphragm 2 in addition to the bias provided by the weaker spring. This causes the variation in boost pressure in chamber 7 to vary the turbine inlet opening similar to the condition shown in FIG. 3 for high power operating conditions. During periods of high rpm and low power, when the turbine inlet pressure exceeds boost pressure, the nozzle will be opened to a degree beyond that for the combined boost pressure and turbine inlet pressure control. Thus at engine operating conditions of high rpm and low power represented by point $0_1$ of point $0_3$ of FIG. 4 the boost pressure is lower than the minimum set for regulator 11 and the biassing pressure on the opposite side of diaphragm 2 is reduced relative the turbine inlet pressure. Therefore the variable inlet area mechanism is opened from the previous value of 70% to a value of approximately 85%. When this occurs the turbocharger rpm is reduced and the boost pressure is also reduced to establish point $0_3$. A direct comparison with FIG. 3 shows even more reduction in boost pressure and turbine inlet pressure to provide a maximum reduction in throttling losses. However, the comparison with the boost fuel only system of FIG. 2 illustrates a graphic reduction in throttling losses.

All of these losses translate directly into increased turbocharger efficiency and to increased fuel efficiency to the engine without giving up the responsiveness associated with this type system.

Having thus described the invention, what is claimed as novel and desired to be secured by Letters Patent of the United States is:

1. A control system for a variable effective inlet area means of a turbocharger turbine having a compressor driven by the turbine to pressurize air for delivery through the compressor outlet to an internal combustion engine, the exhaust of which drives the turbine, said control system comprising:

pressure responsive actuating means for the variaable effective inlet area means of the turbine, said actuating means being responsive to a control signal to increase the effective inlet area as a direct function of the control signal, said actuating means comprising a variable volume chamber formed in part by a movable wall means connected to said pressure signals, a shaft connected to said movable wall means and to the variable effective inlet area means so that expansion of said variable volume chamber increases such effective inlet area, and means for yieldably urging said movable wall toward a position of minumum volume whereby said movable wall is displaced in response to said pressure signals, and means for selectively applying to said actuating means the higher of a signal proportional to compressor outlet pressure and a signal proportional to turbine inlet pressure, said selective application means comprising:

means for connecting the compressor outlet pressure and turbine inlet pressure signals in parallel to said variable volume chamber, said connecting means comprising a conduit, and a passageway means comprising means forming a sleeve through which said shaft extends with a clearance therebetween, one end of said sleeve means open to said variable volume chamber and the other end of said sleeve being open to the turbine inlet pressure, whereby the sleeve means and shaft form an annular passage, and valve means comprising a non return valve in said conduit, for applying the higher of the two pressure signals to said actuating means, whereby turbine inlet throttling losses are minimized during certain engine operating conditions.

2. Apparatus as in claim 1 wherein said movable wall means comprises a diaphragm.

3. A control system for a variable effective inlet area means of a turbocharger turbine having a compressor driven by the turbine to pressurize air for delivery through the compressor outlet to an internal combustion engine the exhaust of which drives the turbine, said control system comprising:

pressure responsive actuating means for the variable effective inlet area means of the turbine, said actuating means being responsive to a control signal to increase the effective inlet area as a direct function of the control signal, and means for selectively applying to said actuating means the higher of a signal proportional to compressor outlet pressure and a signal proportional to turbine inlet pressure, the said selective application means comprising:

means for connecting the compressor outlet pressure and turbine inlet pressure in parallel to said actuating means, and valve means interposed in said connecting means for applying the higher of the two pressure signals to said actuating means, and a variable volume chamber formed in part by a movable wall means positioned within a housing and dividing the housing into a first variable volume chamber connected to the pressure signals and a second variable volume chamber on the opposite side of said movable wall and, a shaft connected to said movable wall means and to the variable effective inlet area means so that expansion of said first variable volume chamber increases such effective inlet area, and means for yieldably urging said movable wall toward a position of minimum volume whereby said movable wall is displaced in response to said pressure signals, said yieldable urging means comprising means for connecting compressor outlet pressure to said second varible volume chamber, and means for limiting the pressure connected to said second variable volume chamber, whereby turbine inlet throttling losses are minimized during certain engine operating losses.

4. Apparatus as in claim 3 wherein said yieldable urging means comprises a spring acting on the side of said movable wall means exposed to said second variable volume chamber.

5. Apparatus as in claim 3 further comprising; means for generating a source of pressure, means for selectively connecting said source of pressure to said first variable volume chamber in response to a control signal, the pressure source means providing a pressure level at least high enough to override the control signals and place the variable effective inlet means in its maximum area condition.

* * * * *